United States Patent
Sandstrom

(10) Patent No.: US 12,262,701 B1
(45) Date of Patent: Apr. 1, 2025

(54) PORTABLE SELF-CONTAINED BAIT TUBE SYSTEM

(71) Applicant: Thomas Sandstrom, Oakland Park, FL (US)

(72) Inventor: Thomas Sandstrom, Oakland Park, FL (US)

(*) Notice: Subject to any disclaimer, the term of this patent is extended or adjusted under 35 U.S.C. 154(b) by 67 days.

(21) Appl. No.: 17/552,202

(22) Filed: Dec. 15, 2021

Related U.S. Application Data

(60) Provisional application No. 63/125,837, filed on Dec. 15, 2020.

(51) Int. Cl.
*A01K 97/05* (2006.01)

(52) U.S. Cl.
CPC .................. *A01K 97/05* (2013.01)

(58) Field of Classification Search
CPC ...... A01K 97/05; A01K 63/02; A01K 63/042; A01K 61/10; A01K 63/00; A01K 63/047; B63B 35/26
See application file for complete search history.

(56) References Cited

U.S. PATENT DOCUMENTS

| | | |
|---|---|---|
| 2,680,424 A | 6/1954 | Brown |
| 4,089,298 A | 5/1978 | Wilson |
| 4,357,902 A | 11/1982 | Sheldon et al. |
| 4,455,966 A | 6/1984 | Knowles |
| 4,677,785 A | 7/1987 | Lambourn |
| 5,220,880 A | 6/1993 | Alworth et al. |
| 5,267,410 A | 12/1993 | Peyatt |
| 5,632,220 A | 5/1997 | Vento |
| RE35,895 E | 9/1998 | Bass, Jr. et al. |
| 5,799,435 A | 9/1998 | Stafford |
| 6,442,888 B1 * | 9/2002 | Morrow ................. A01K 97/00 43/57 |
| 7,328,813 B2 | 2/2008 | Pfiser et al. |
| 7,644,535 B2 | 1/2010 | Sloop |
| 8,813,685 B2 * | 8/2014 | Vento ..................... A01K 63/00 119/226 |
| 8,841,400 B2 | 9/2014 | Henning et al. |
| 10,750,732 B2 | 8/2020 | Simko |
| 2013/0305605 A1 * | 11/2013 | Wang ...................... A01G 9/02 47/66.6 |

* cited by examiner

Primary Examiner — Joshua J Michener
Assistant Examiner — Henry Hooper Mudd
(74) Attorney, Agent, or Firm — Mark D. Bowen, Esq.; Malin Haley DiMaggio & Bowen, P.A.

(57) ABSTRACT

A portable bait tube system integrated into a compact, self-contained system that merely requires a simple electrical connection to function when submerged within a body of water. A submersible DC powered pump has a water inlet and a water outlet connected in fluid communication with an inlet of a manifold, the manifold further including a plurality of upwardly disposed outlets. A corresponding plurality of bait tubes are provided for removable connection to the corresponding manifold outlets. Each bait tube comprises an elongate, hollow structure defining a generally oval cross section. Upon activation, water is pumped upward through each bait tube and allowed to overflow from the top thereof for recirculation. As should be apparent, live baitfish are placed into each bait tube in a head down orientation whereby water entering the tube inlet flows through the bait's gills thereby maintaining the bait in a live condition.

5 Claims, 4 Drawing Sheets ic # PORTABLE SELF-CONTAINED BAIT TUBE SYSTEM

CROSS REFERENCE TO RELATED APPLICATIONS

This application claims the benefit of provisional U.S. Patent Application Ser. No. 63/125,837, filed on Dec. 15, 2020.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention generally relates to an apparatus for keeping fish alive, and more particularly to an apparatus for keeping baitfish alive onboard fishing vessels.

2. Description of Related Art

Tanks, such as livewells, are used on sport fishing vessels to keep baitfish alive prior to use. Livewells are typically configured to continuously pump fresh water from the body of water upon which the fishing vessel is operating into the tank. While livewells are generally suitable for keeping smaller baitfish alive, they are not well suited for keeping larger baitfish alive for extended periods of time. Larger baitfish, such as tuna, must constantly swim to ensure sufficient waterflow past the gills to stay alive. Thus, crews wishing to use live baits had to either rig them up right after capture or use a wash-down hose to keep water flowing over the baits' gills.

In response, so called "tuna tubes" or "bait tubes" have been developed to keep bait fish, such as tuna, alive for hours by pumping water through their gills. A bait tube provides a sleeve-like structure which receives and confines the baitfish, typically in a head down position, while water is circulated up through the bottom of the tube to provide flow through the gills. U.S. Pat. No. 5,220,880, issued to Alworth et al., discloses an apparatus for maintaining live fish including a cylinder for receiving the fish and pumping water through perforations. Most bait tube systems comprise bulky structures requiring permanent installation within existing livewells. Such systems thus limit livewell functionality and available useable volume. Other bait tube systems rely on the vessel's livewell pump to provide a source of pressurized ocean water. As a result, such systems require often complex retrofits to the vessel piping and plumbing and/or the mechanical and electrical installation of dedicated pumps. Accordingly, there exists a need in the art for a compact, self-contained bait tube system that avoids the limitations and disadvantages present in the art.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56 (a) exists.

BRIEF SUMMARY OF THE INVENTION

The present invention overcomes the limitations and disadvantages present in the art by providing a portable bait tube system having all components integrated into a compact, self-contained system that merely requires a simple electrical connection to function. The bait tube system of the present invention installed in a simple bucket or other water tank, including an existing vessel livewell. The bait tube system of the present invention includes a submersible DC powered pump having a housing containing an electric motor and impeller, and flexible power cord extending therefrom for connection to an existing vessel DC power source. The housing includes a lower portion defining a water inlet, and a water outlet. The water inlet is placed in fluid communication with a source of water, for example by submerging the housing with a bucket, tank, or livewell. The water outlet is connected in fluid communication with an inlet of a manifold, the manifold further including a plurality of upwardly disposed outlets. A corresponding plurality of bait tubes are provided for removable connection to the corresponding manifold outlets. Each bait tube comprises an elongate, hollow structure preferably defining a generally oval cross section. Each bait tube further includes a bottom adapted with a water inlet configured for removable connection one of the manifold outlets, and a generally open top end. With the bait tubes installed, the system is placed within a suitable bucket, livewell, or other water container with the pump submerged. Upon activation, water is pumped upward through each bait tube and allowed to overflow from the top thereof for recirculation. As should be apparent, live baitfish are placed into each bait tube in a head down orientation whereby water entering the tube inlet flows through the bait's gills thereby maintaining the bait in a live condition.

Accordingly, it is an object of the present invention to provide advancements in the field of baitfish utilization.

It is another object of the present invention to provide a portable, compact bait tube system.

Still another object of the present invention is to provide such a system that may be used with a simple bucket.

These and other objects are met by the present invention which will become more apparent from the accompanying drawing and the following detailed description of the drawings and various embodiments.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

In describing this invention, the word "connected" is used. By "connected" is meant that the article or structure referred to is joined, either directly, or indirectly, to another article or structure. By "indirectly joined" is meant that there may be an intervening article or structure imposed between the two articles which are "connected". "Directly joined" means that the two articles or structures are in contact with one another or are essentially continuous with one another. By adjacent to a structure is meant that the location is near the identified structure.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

FIGS. 1-5 illustrate a portable bait tube system, generally referenced as 10, in accordance with the present invention. Bait tube system 10 comprises a compact, self-contained system that merely requires a simple electrical connection to and a water container to function. In one embodiment, bait tube system 10 may be used with a simple bucket or other water tank, including an existing vessel livewell, generally referenced as 100 in FIG. 1.

Figure 1:
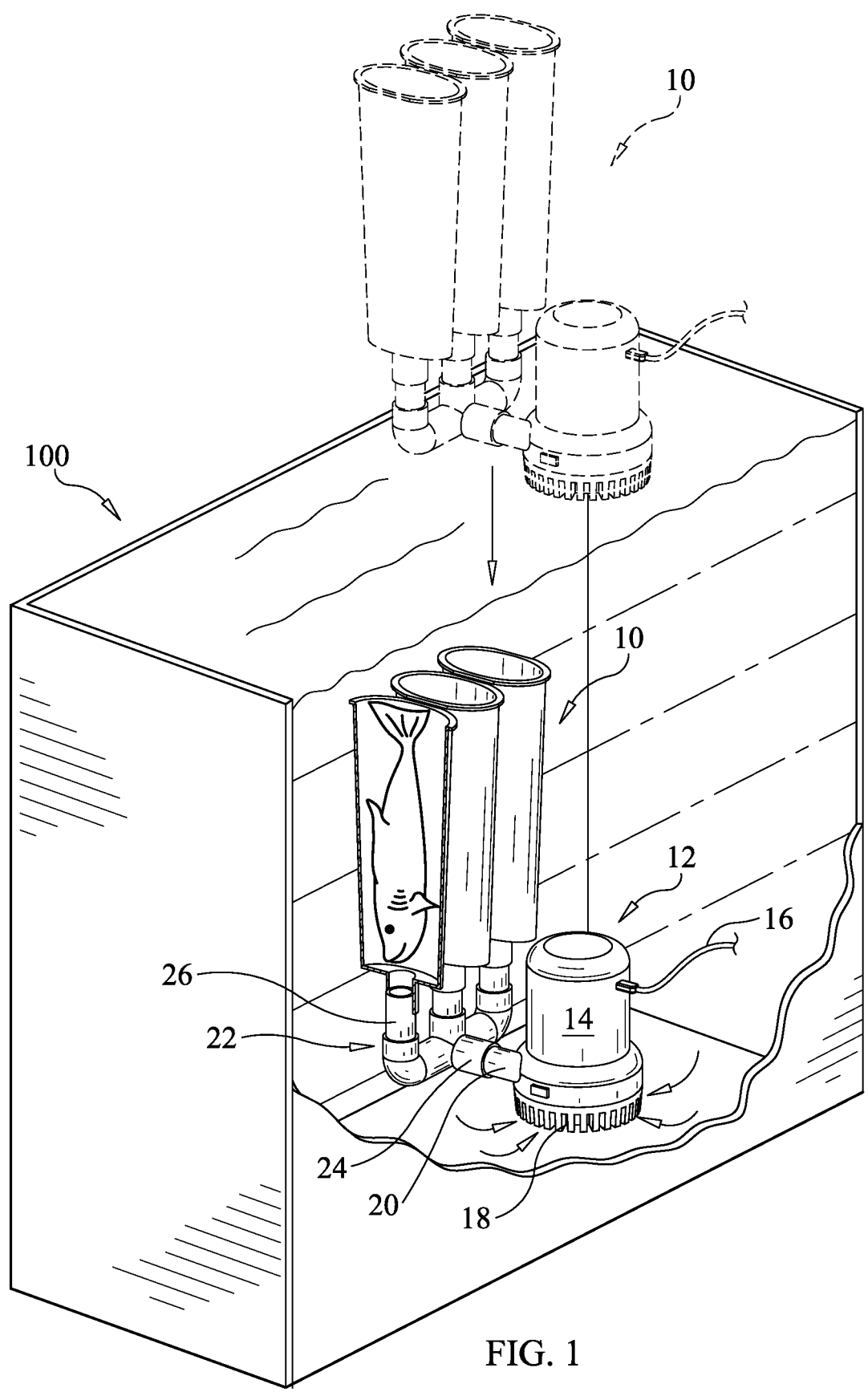
FIG. 1 is a front perspective view illustrating a bait tube system in accordance with the present invention in relation to a vessel livewell.
Figure 2:
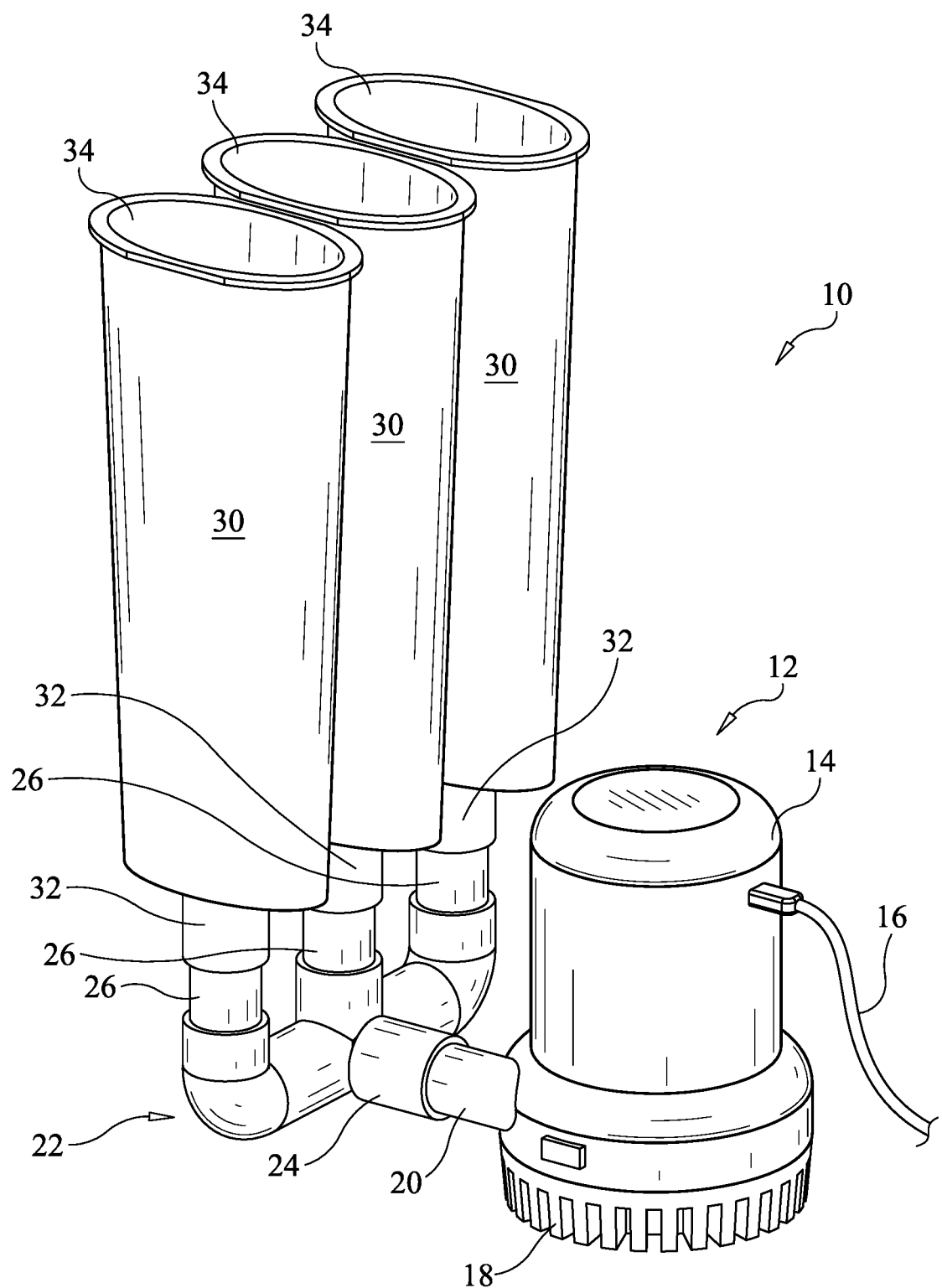
FIG. 2 is a front perspective view of the bait tube system standing alone.
Figure 3:
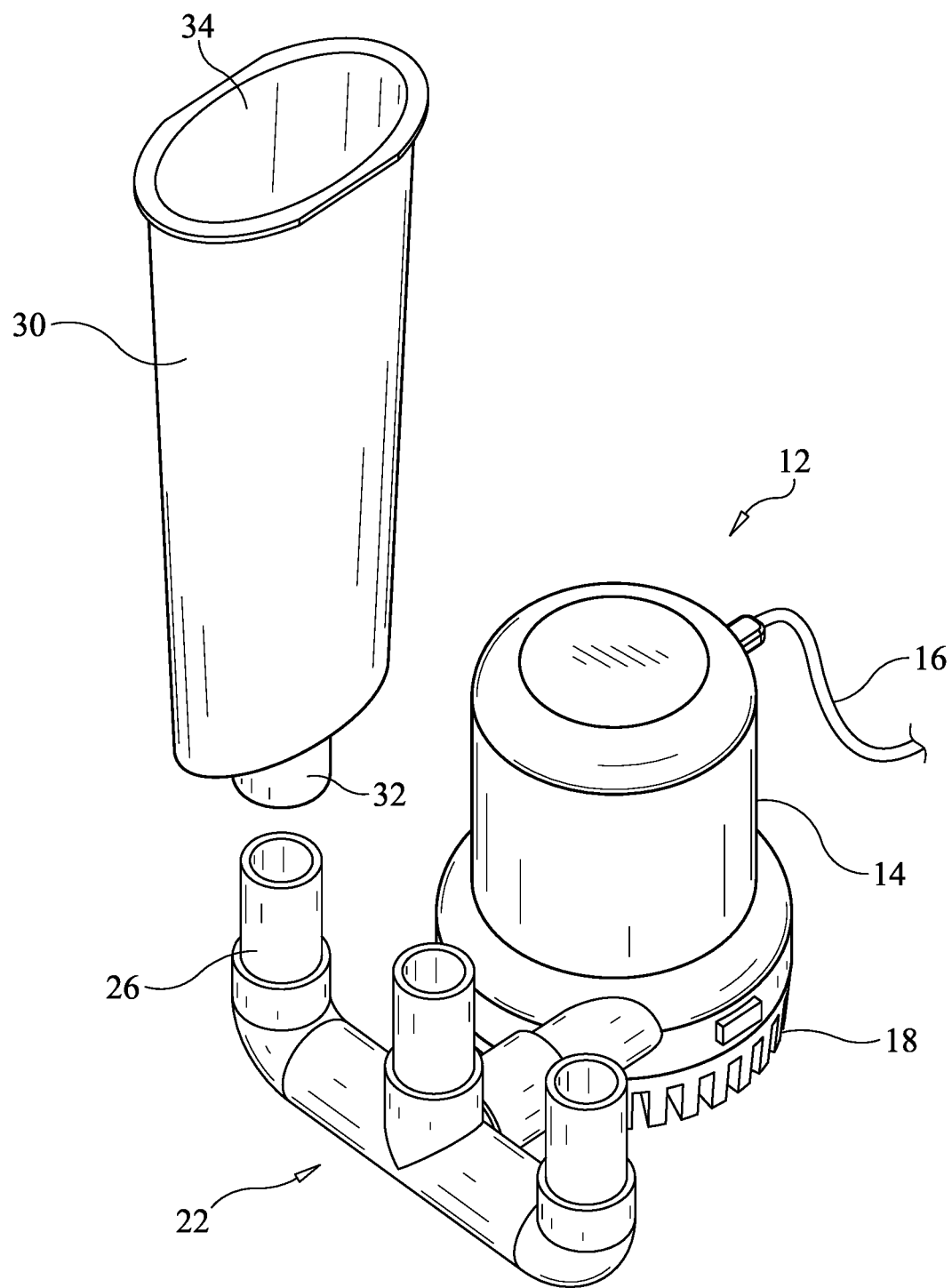
FIG. 3 is a partial rear exploded view thereof.

As best seen in FIGS. 1 and 2, bait tube system 10 includes a submersible DC powered pump 12, such as a bilge pump, having an exterior housing 14 containing an electric motor and impeller (not shown). Pump 12 further includes a flexible power cord 16 extending therefrom for connection to an existing vessel DC power source outlet. In a contemplated alternate embodiment, pump 12 may be battery powered. Pump housing 14 includes a lower portion defining a water inlet 18, further includes and a water outlet 20. Water inlet 18 is placed in fluid communication with a source of water, for example by submerging the housing with a bucket or livewell as seen in FIG. 1. A manifold, generally referenced as 22, has an inlet 24 connected in fluid communication with water outlet 20 of pump 12. In a preferred embodiment, manifold 22 includes a plurality of upwardly disposed manifold outlets, each referenced as 26. A corresponding plurality of bait tubes 30 are provided for removable connection to the corresponding manifold outlets, as illustrated in FIGS. 1 and 2. FIG. 3 depicts a rear view of bait tube system 10 with only a single bait tube. In a preferred embodiment, the manifold includes three outlets configured for use with a corresponding three bait tubes 30 as illustrated in FIGS. 1 and 2. It should be noted, however, that the present invention is scalable from a configuration having only one bait tube to configurations having more than three bait tubes.

Figure 4:
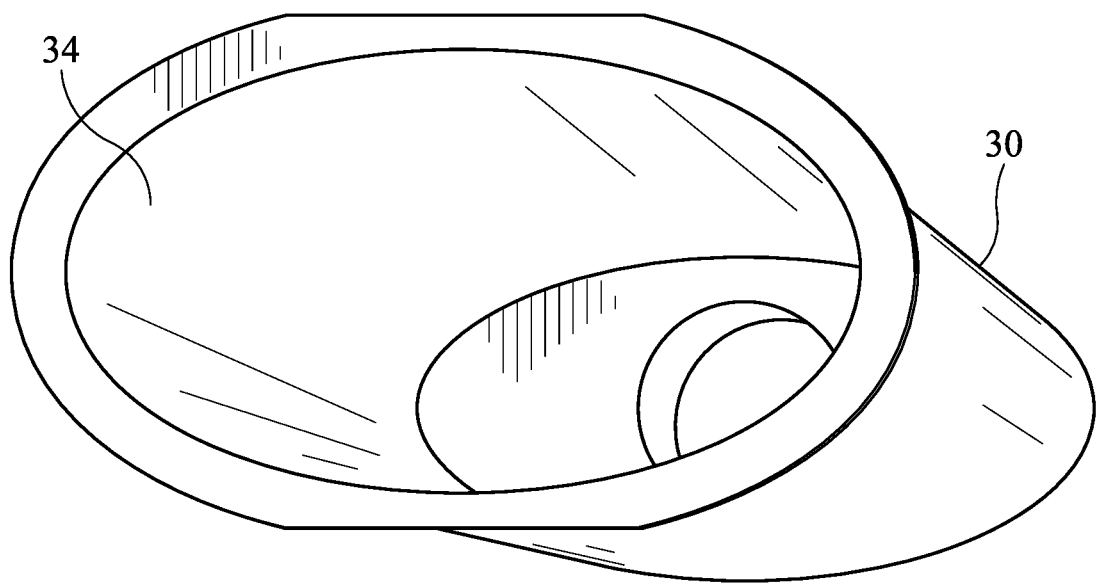
FIG. 4 is a perspective top view a bait tube in accordance with the present invention.
Figure 5:
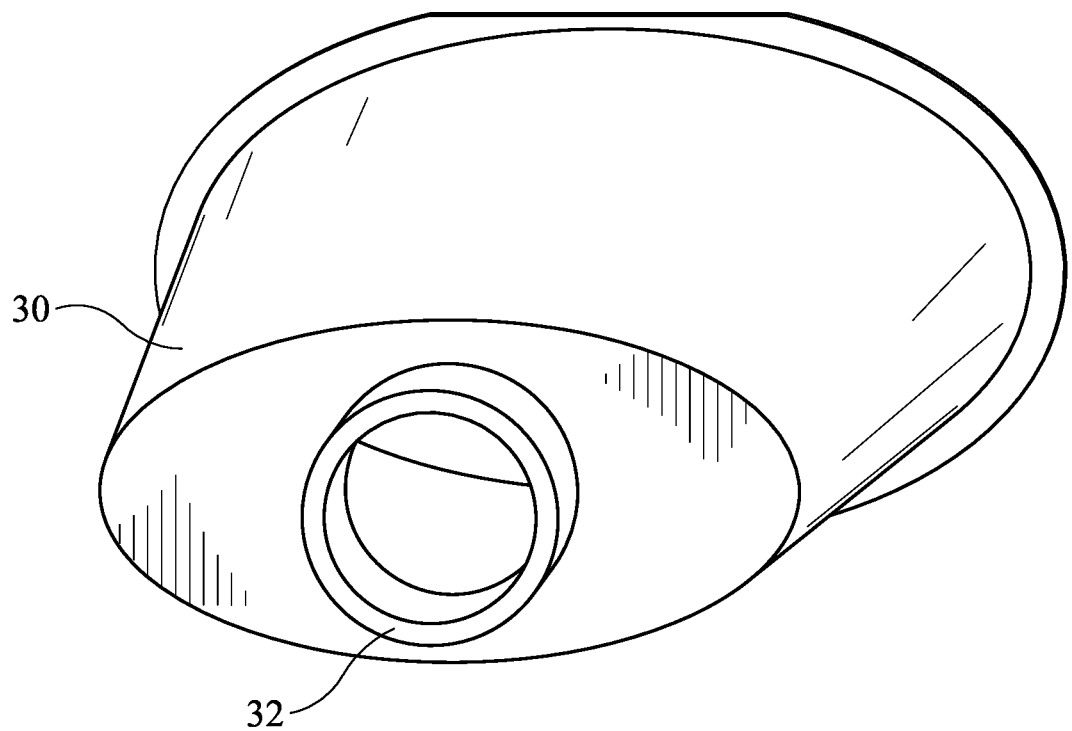
FIG. 5 is a perspective bottom view thereof.

As best seen in FIGS. 4-5, each bait tube 30 comprises an elongate, hollow structure defining a generally oval cross section. In one embodiment each bait tube 30 has a generally oval cross section that tapers from the top to the bottom. More particularly, the oval cross-section of the top is larger than the oval cross section at the bottom. The oval cross-section is further significant in minimizing the space required when the bait tube system is configured with a plurality of bait tubes disposed in substantially adjacent relation. Bait tubes 30 are preferably fabricated from a non-corrosive and preferably plastic material such as PVC, or other suitable material. Each bait tube 30 further includes a bottom adapted with a water inlet 32 configured for removable connection one of the manifold outlets as illustrated in FIGS. 1 and 2. Each bait tube 30 further incudes a generally open top end 34. With the bait tubes installed, the system is placed within a suitable bucket, livewell, or other water container with the pump submerged. Upon activation, water is pumped upward through each bait tube and allowed to overflow from the top thereof for recirculation. As should be apparent, live baitfish are placed into each bait tube in a head down orientation whereby water entering the tube inlet flows through the bait's gills thereby maintaining the bait in a live condition.

A significant aspect of the present invention involves providing a bait tube system that is small, self-contained, and portable. Bait tube system 10 of the present invention provides a small, self-contained, and portable unit that may be easily transported to a fishing vessel, carried onboard, simply placed in the vessel's livewell and plugged into an existing vessel power outlet. In addition, the bait tube system of the present invention is compact enough such that it may further be used with a bucket, e.g. a 5-gallon bucket.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A portable bait tube system for removably receiving a live bait fish therein, said bait tube system comprising:
    a submersible electric pump;
    said pump having a water inlet disposed in proximity to the bottom thereof, and a water outlet;
    a vertically disposed bait tube removably connected to said outlet;
    said bait tube including an elongate, hollow structure defining a generally oval cross-section, and further including a bottom adapted with a bait tube water inlet configured for removable connection to said pump water outlet, and a generally open top end forming a bait tube water outlet, said bait tube water outlet defining an opening having a cross-sectional area which is greater than the cross-sectional area of said bait tube water inlet; and
    when installed within a container of water with the pump submerged, water is pumped upward through the bait tube, directly over and through the bait fish before overflowing from the top of the bait tube for recirculation.

2. The portable bait tube system according to claim 1 wherein the pump is DC powered.

3. The portable bait tube system according to claim 1 wherein the oval cross-section of said bait tube narrows from the top portion thereof to the bottom portion thereof.

4. A portable bait tube system for removably receiving live baitfish comprising:
- a submersible electric pump having a power cord;
- said pump having a water inlet disposed in proximity to the bottom thereof, and a water outlet;
- said water outlet in fluid communication with a manifold having a manifold inlet in fluid communication with the water outlet of said pump;
- said manifold further including a plurality of manifold outlets;
- each of said plurality of manifold outlets having a bait tube removably connected thereto, each bait tube sized for receiving one of the baitfish removably received therein without requiring disassembly of the bait tube system;
- each bait tube defining an elongate, hollow structure having a generally oval cross-section, and further including a bottom adapted with a bait tube water inlet configured for removable connection to one of said plurality of manifold outlets, and a generally open top end, wherein said open top end defines a cross-sectional area which is greater than a cross-sectional area defined by said bait tube water inlet; and
- when installed within a container of water with the pump submerged and the power cord electrically connected to a power source, water is pumped upward through the bait tube to provide a flow of water through the gill's of the bait fish before overflowing from the top of the bait tube for recirculation.

5. The portable bait tube system according to claim 4 wherein the oval cross-section of said bait tube narrows from the top portion thereof to the bottom portion thereof.

\* \* \* \* \*